(12) United States Patent
Wade et al.

(10) Patent No.: US 7,182,046 B2
(45) Date of Patent: Feb. 27, 2007

(54) DEFORMABLE COMBUSTION CHAMBER-BASED INTERNAL COMBUSTION ENGINE AND GENERATOR

(75) Inventors: Jon P. Wade, Wellesley, MA (US); Robert C. Zak, Bolton, MA (US)

(73) Assignee: AgilePower Systems, Inc., Bolton, MA (US)

( * ) Notice: Subject to any disclaimer, the term of this patent is extended or adjusted under 35 U.S.C. 154(b) by 0 days.

(21) Appl. No.: 11/289,059

(22) Filed: Nov. 29, 2005

(65) Prior Publication Data

US 2006/0156999 A1    Jul. 20, 2006

Related U.S. Application Data

(60) Provisional application No. 60/631,360, filed on Nov. 29, 2004.

(51) Int. Cl.
  F02B 1/12    (2006.01)
  F02B 69/06   (2006.01)
  F02B 75/28   (2006.01)

(52) U.S. Cl. .................... 123/27 R; 123/21; 123/51 R

(58) Field of Classification Search .................. 123/21, 123/27 R, 51 R, 51 A, 51 B, 51 BD, 65 A, 123/65 V, 65 VB, 65 VC, 86
See application file for complete search history.

(56) References Cited

U.S. PATENT DOCUMENTS

| 5,222,466 | A  | 6/1993 | Gratziani  |
| 6,276,313 | B1 | 8/2001 | Yang et al. |
| 6,698,394 | B2 | 3/2004 | Thomas     |

Primary Examiner—Noah P. Kamen
(74) Attorney, Agent, or Firm—Wilmer Cutler Pickering Hale & Dorr LLP

(57) ABSTRACT

A reciprocating internal combustion engine is based on Homogenous Charge Compression Ignition (HCCI) that occurs in a deformable, resonant combustion chamber and that is coupled mechanically to efficient, resonant, electro-mechanical transducers acting as motors and generators. The mechanical coupling also implements fuel/air intake valves and exhaust valves. Embedded sensors allow an electronic control system to start the engine and thereafter to maintain operational configuration of the moving components in response to the effects of imperfect mechanical fabrication and/or assembly and dynamic changes in mechanical properties of the materials with run-time temperature and engine life.

10 Claims, 13 Drawing Sheets

Expanded Cross Section of Combustion Chamber and Associated Components

Expanded Cross Section of Combustion Chamber
Fig. 3 and Associated Components

Fig. 4 Combustion Chamber Detail

Fig. 5 Combustion Chamber with interlocking rings - detail

Fig. 6 Combustion Chamber with Dimples - Detail

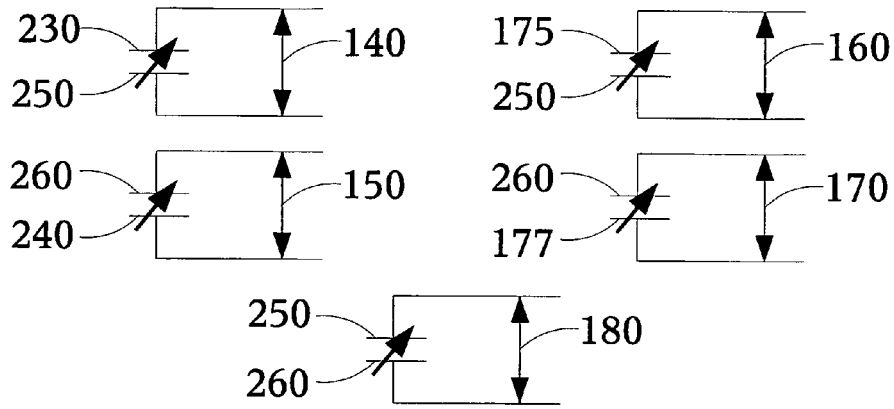
a. Capacitive Sensors
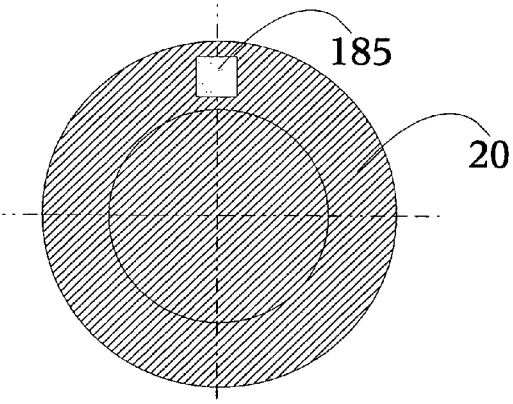
b. Combustion Chamber Temperature Sensor (Top View)
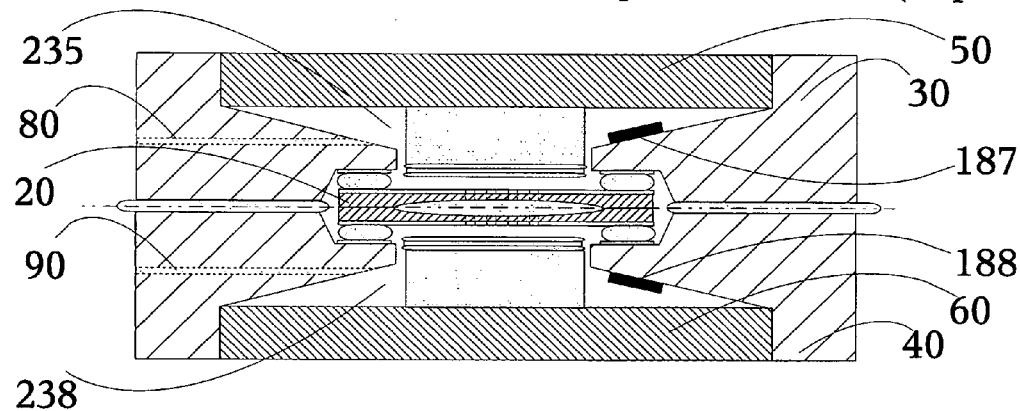
c. Fuel/Air and Exhaust Temperatures Sensors
Fig. 8    Embedded Sensor Implementation Detail

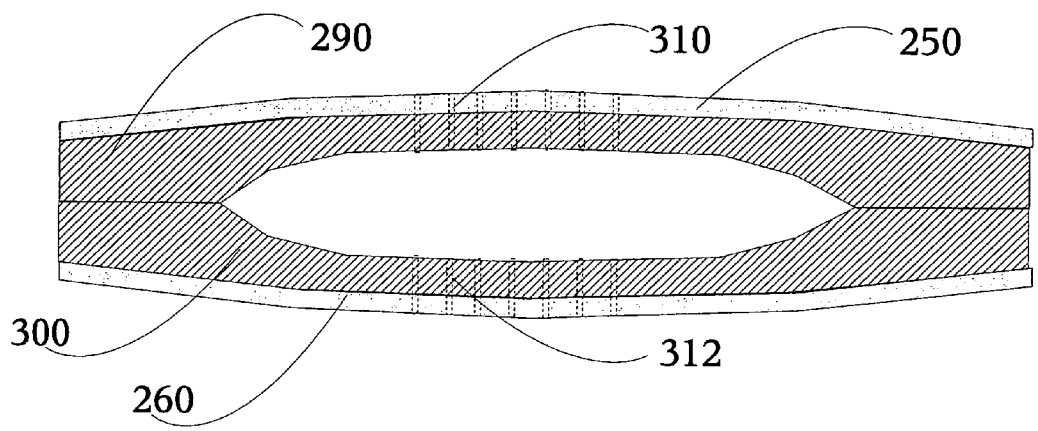
a. Maximally distended
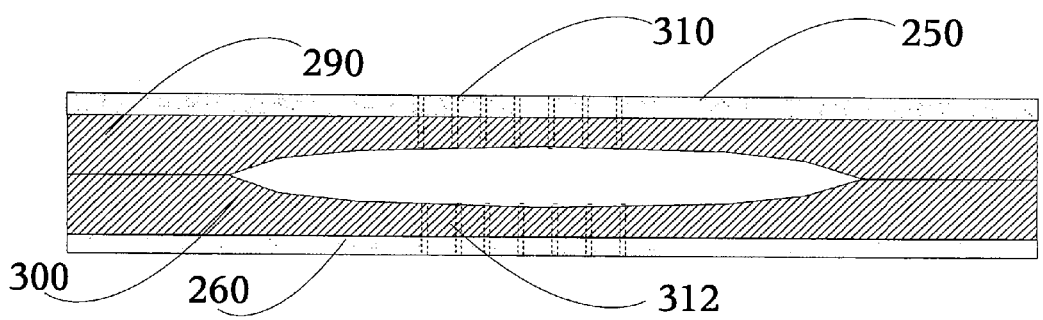
b. Static configuration
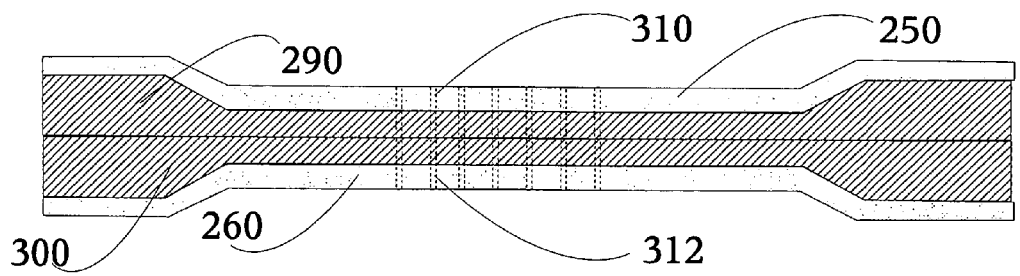
c. Maximally compressed
Fig. 9  Combustion Chamber Operation

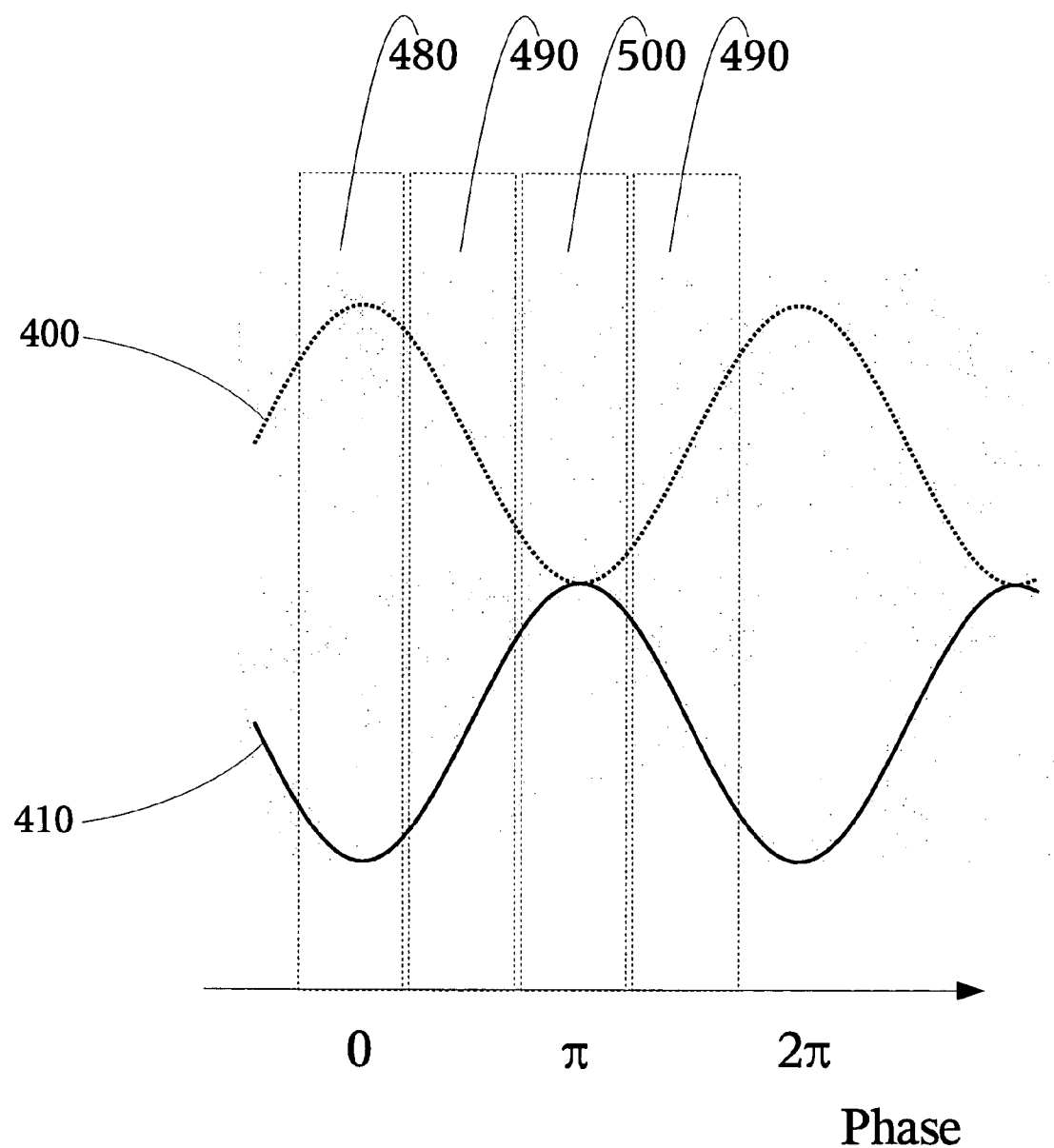
Fig. 10  Load Control Regimes

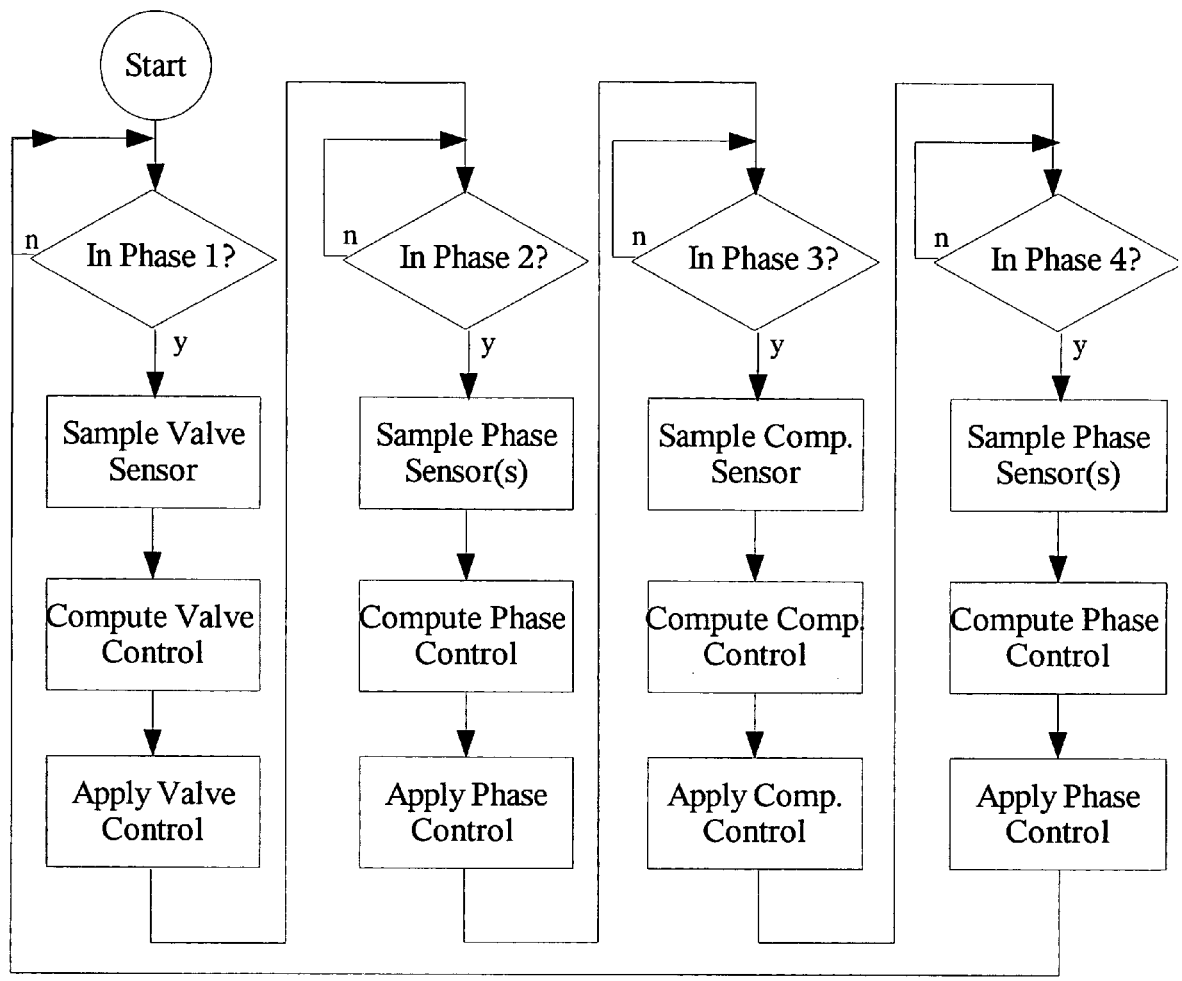
a. Control System Flow Chart
| | Phase | | | |
|---|---|---|---|---|
| | 1 | 2 | 3 | 4 |
| Fuel /Air Valve | Open | - | - | - |
| Exhaust Valve | Open | - | - | - |
b. 2-Stroke Valve Value Targets
| | Cycle.Phase | | | | | | | |
|---|---|---|---|---|---|---|---|---|
| | 1.1 | 1.2 | 1.3 | 1.4 | 2.1 | 2.2 | 2.3 | 2.4 |
| Fuel/Air Valve | Open | - | - | - | Closed | - | - | - |
| Exhaust Valve | Closed | - | - | - | Open | - | - | - |
c. 4-Stroke Valve Value Targets
Fig. 11  Control Flow Chart and Valve Parameters

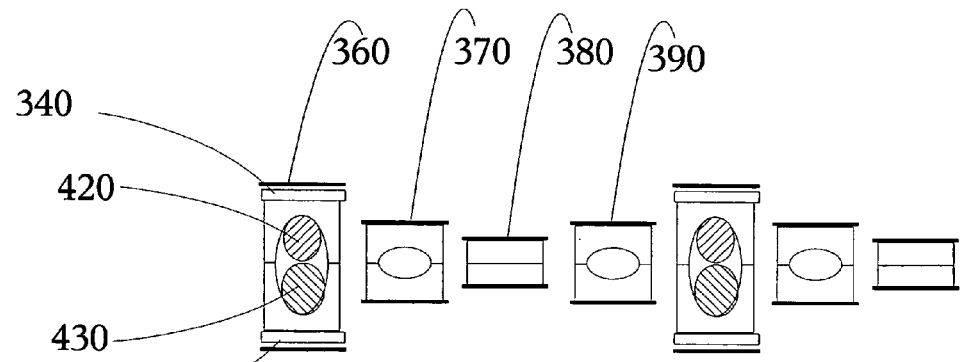
a. Combustion Chamber and valve operation
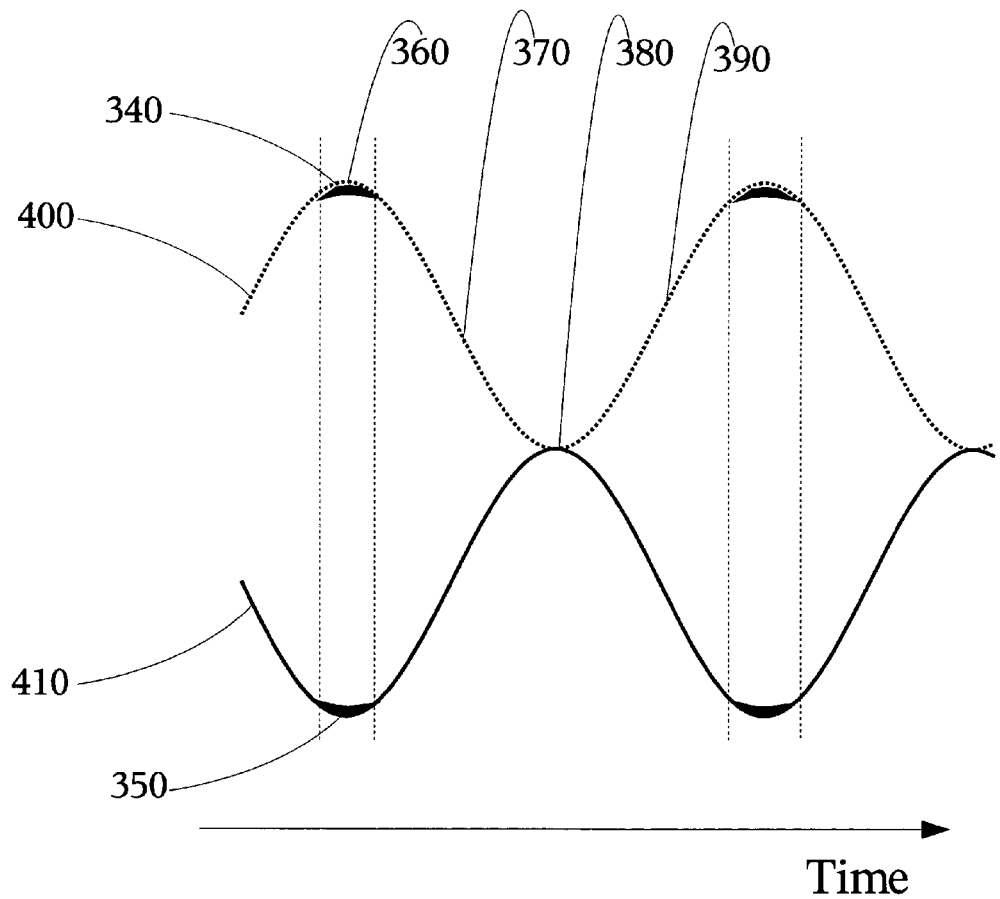
b. Waveform of combustion chamber displacement
Fig. 12  2-stroke Operation

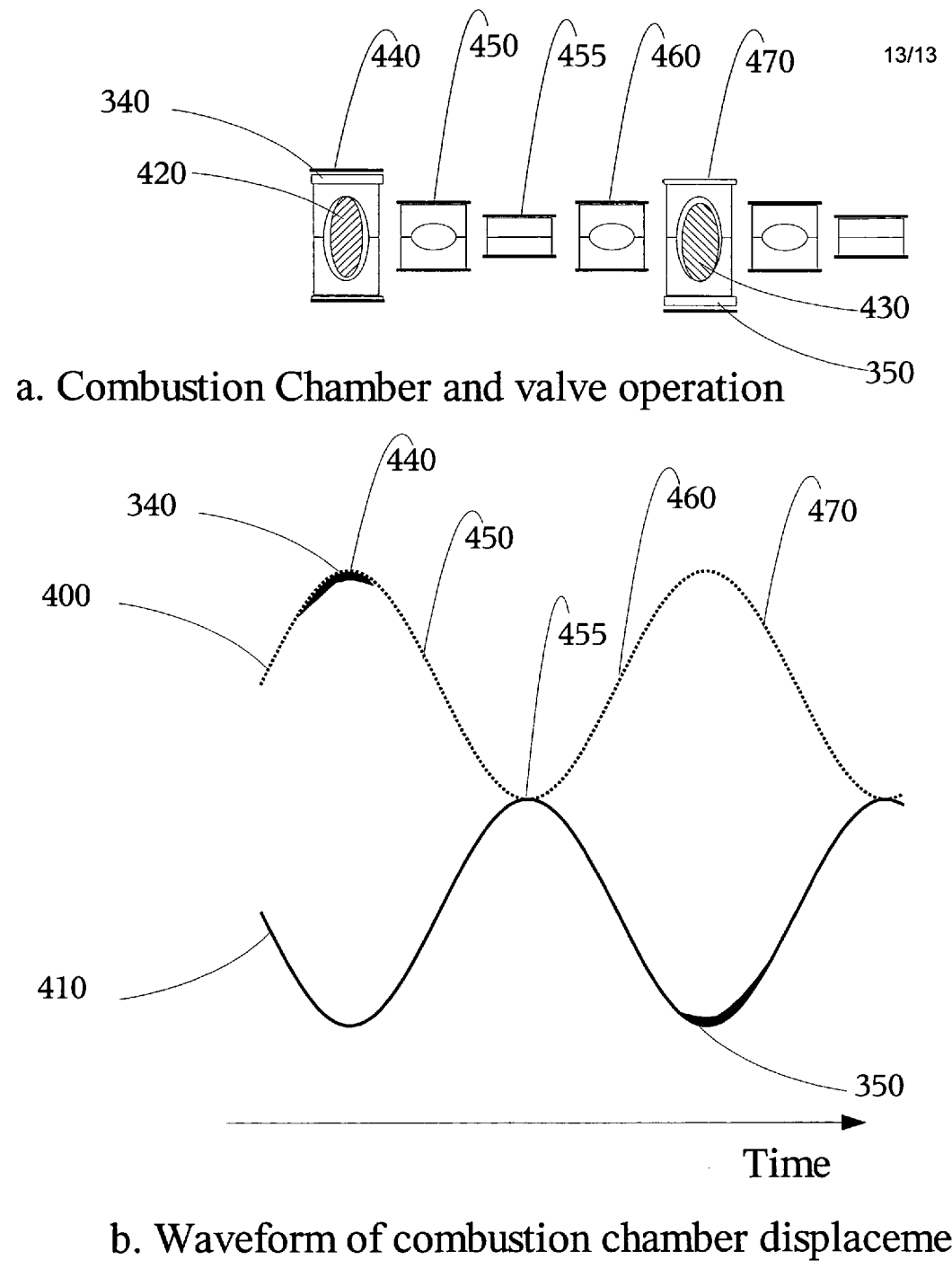
a. Combustion Chamber and valve operation
b. Waveform of combustion chamber displacement
Fig. 13  4-stroke Operation

DEFORMABLE COMBUSTION CHAMBER-BASED INTERNAL COMBUSTION ENGINE AND GENERATOR

CROSS REFERENCE TO RELATED APPLICATIONS

This application claims benefit of the following patent application, assigned to the assignee of the present application and which is incorporated by reference herein in its entirety: U.S. Provisional Patent Application Ser. No. 60/631,360 filed Nov. 29, 2004, entitled "Deformable Combustion Chamber-Based Internal Combustion Engine and Generator."

BACKGROUND

Many mobile electronic systems require mobile power sources. These systems have power requirements that range from milliwatts to hundreds of kilowatts, and include systems from small embedded sensors to motor vehicle power systems. Currently, these power requirements are addressed by a range of technologies that includes electro-chemical batteries, photovoltaic cells, thermoelectric generators, fuel cells and internal combustion engines. These solutions, however, are oftentimes insufficient in a number of important aspects, including a low energy density (electro-chemical batteries), a dependency on an external primary energy source (photovoltaic and thermoelectric generators), high cost and complexity (fuel cells), low efficiency (internal combustion engines) and an inability to scale to small systems (diesel and spark ignition internal combustion engines.)

Homogenous Charge Combustion Ignition (HCCI) has been recognized as a new combustion mode for internal combustion engines. HCCI relies upon a lean and well-mixed air-fuel mixture that is compressed. A resulting spontaneous burn produces a flameless energy release in a large zone almost simultaneously. This operation is very different from the spark/gasoline burn or the compression/diesel burn. HCCI can thus be a basis for an efficient engine, like a diesel engine, but without the $NO_x$ or particulate emissions of diesel. In rotating, fixed compression engines, HCCI, however, has resulted in increased emissions of unburned hydrocarbons. In addition, the development of these engines has been hindered by the requirement for complex control mechanisms.

A free-piston Microcombustion Engine/Generator is known to use HCCI on a small scale to achieve electrical power generation on the order of 10 W from liquid fuels.

Implementation of HCCI on a small scale that uses pistons in a chamber severely limits the efficiency, and possibly the viability, of a microcombustion engine due to "blowby" of the air/fuel mixture during compression and of exhaust products during the power stroke of the engine. More importantly, fabricating and operating pistons in cylinders at such small scale leads to significant, if not insurmountable, practical difficulties.

It has been shown that a gap which is 1/1000th of a diameter of the piston itself is large enough to reduce engine efficiency by a factor of two or more; and limit the actual compression ratio, because the piston is compressing a fluid into a cylinder while the fluid is simultaneously leaking out around the piston walls. Further, it is impractical to implement such tight manufacturing tolerances using currently known micromachining practices.

The issues associated with pistons in cylinders, however, are not limited to fabrication technology and its associated minimum tolerances. Even if a piston and cylinder could be fabricated with closely matching sizes, these dimensions would change in situ as a result of uneven heat flow in the system generated by high temperature combustion that occurs at the piston head. Even with material of matched thermal coefficients of expansion, the piston would tend to become instantaneously hotter than the surrounding cylinder, and, if the separation distance were too small, would tend to bind in the cylinder. At the same time, increasing the separation distance between the piston and cylinder increases blowby and, therefore, limits the attainable compression. Limited compression can compromise the performance or, in some cases, prevent the occurrence of HCCI, thus rendering the design inoperable.

SUMMARY

In one embodiment, a reciprocating internal combustion engine is based on Homogenous Charge Compression Ignition (HCCI) that occurs in a deformable, resonant combustion chamber and which is coupled mechanically to efficient, resonant, electro-mechanical transducers acting as motors and generators. The mechanical coupling also implements fuel/air intake valves and exhaust valves. Construction includes embedded sensors that allow an electronic control system to start the engine and thereafter to maintain operational configuration of the moving components in response to the effects of imperfect mechanical fabrication and/or assembly and dynamic changes in mechanical properties of the materials with run-time temperature and engine life.

One embodiment, described herein, provides high energy density, independence from external sources, low cost and low complexity and an ability to scale down to supply electrical power for mobile electronic and electrical systems. The embodiments described here are based on Homogenous Charge Compression Ignition (HCCI) of a high energy density fuel, including, but not limited to liquid hydrocarbon fuels, e.g., gasoline, diesel fuel, propane, and butane; as well as hydrogen, and air mixture in a deformable combustion chamber, with integral electronically actuated valves and an efficient electric generator.

One embodiment includes an active electronic control that uses real-time feedback from embedded system sensors to enable robust engine operation by controlling mechanical placement of key system components, e.g., valve openings and timing, in response to mechanical variability due to manufacturing and time varying expansion and contraction of system components.

One embodiment is amenable to micrometer scale fabrication techniques and can, therefore, be scaled down in size to meet milliwatt scale loads. In addition, larger versions, and/or aggregations of multiple implementations can create systems capable of supplying large amounts of mobile electrical power based on readily available fuels.

BRIEF DESCRIPTION OF DRAWINGS

FIG. 8 shows an implementation of the embedded sensors;

FIGS. 9a–c show the operation of the deformable combustion chamber;

FIG. 10 shows the various load control regimes used in the electronic control of typical engine operation;

FIGS. 11a–c show a flow chart of a control algorithm implemented by the electronic control system.

FIGS. 12a–b show operation of an engine in a 2-stroke configuration; and

FIGS. 13a–b show operation of an engine in a 4-stroke configuration.

DETAILED DESCRIPTION

Figure 1:
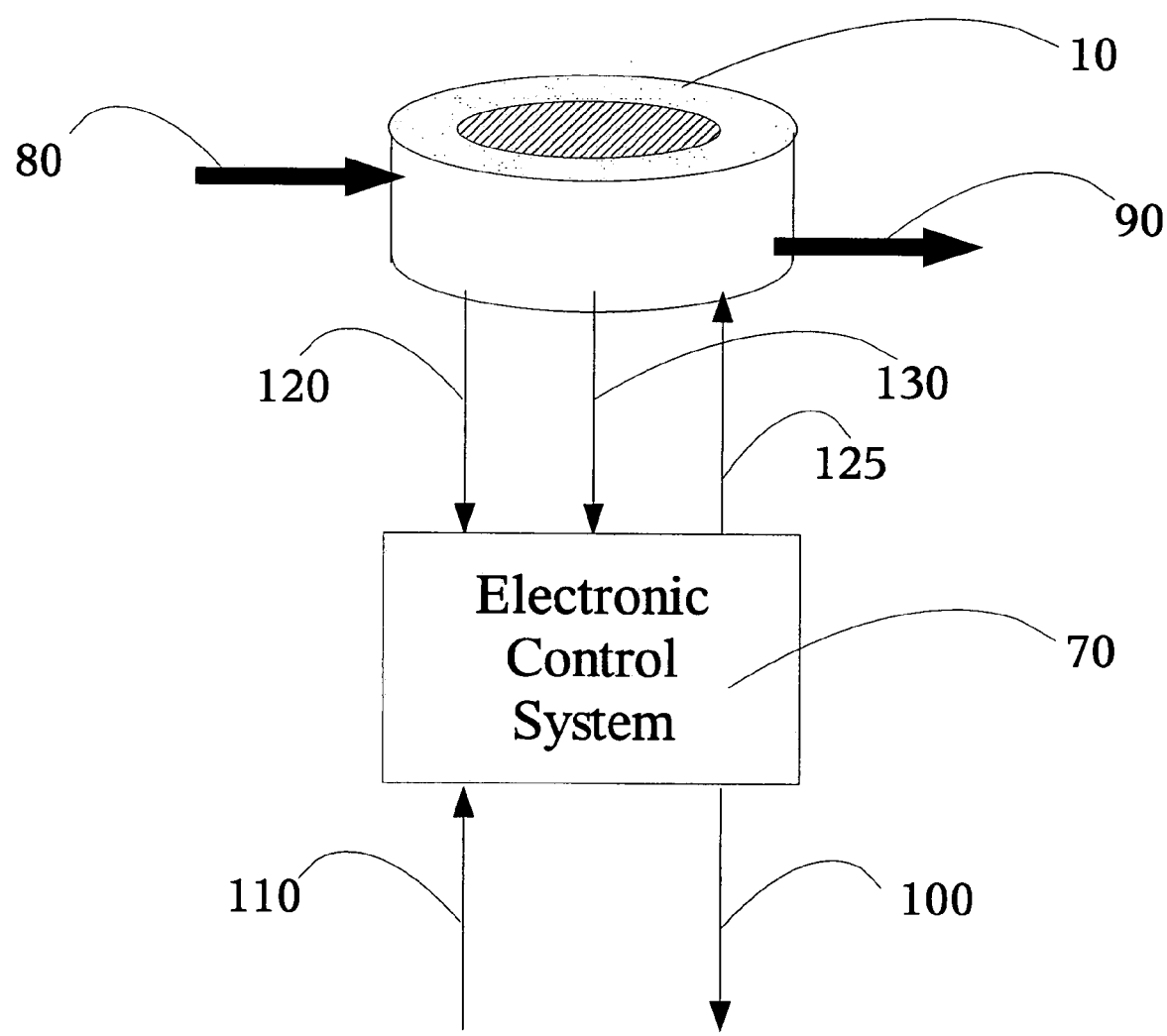
FIG. 1 shows a schematic of one embodiment of the present invention.

In the embodiment shown in FIG. 1, the system has two parts: an integrated engine and electro-mechanical transducers (acting as motor/generators) (10) coupled to an electronic control system (70). The engine consumes a fuel and air mixture (80) and produces exhaust (90) from combustion products. The electronic control system (70) receives sensor input from the engine (120). The details of the sensor input are described below, and include position, pressure and temperature sensors of various components in the engine. The electronic control system also receives unregulated electrical output (130) from the generator. It also supplies signals (125) that control the electrical valve actuators in the engine (10).

In one embodiment, the control of the electrical valve actuators is accomplished via a variable electrical load applied to the raw electrical output (130) from the electro-mechanical transducers (50, 60) by the electronic control system, as in FIG. 1 (70).

When starting the engine, the electronic control system (70) applies power from an external electrical power source (110) to the electro-mechanical transducers (10), acting as a motors, to start the engine—i.e. to initiate self-sustaining combustion operation.

In one embodiment of the invention, to be discussed in more detail below, the electrical input from the control system drives the electro-mechanical transducers into resonance and the mechanical stimulus from the transducers drives the combustion chamber into resonance.

The resonant frequency of a vibrating mechanical system is a function of the geometry of the system and material properties. Methods of engineering structures with a desired resonant frequency include, but are not limited to analytic solutions, finite element analysis, and empirical "trial and error".

The resonant frequency of the electro-mechanical transducers and the combustion chamber are thus designed to be closely matched, and is the normal operating frequency of the engine.

Figure 2:
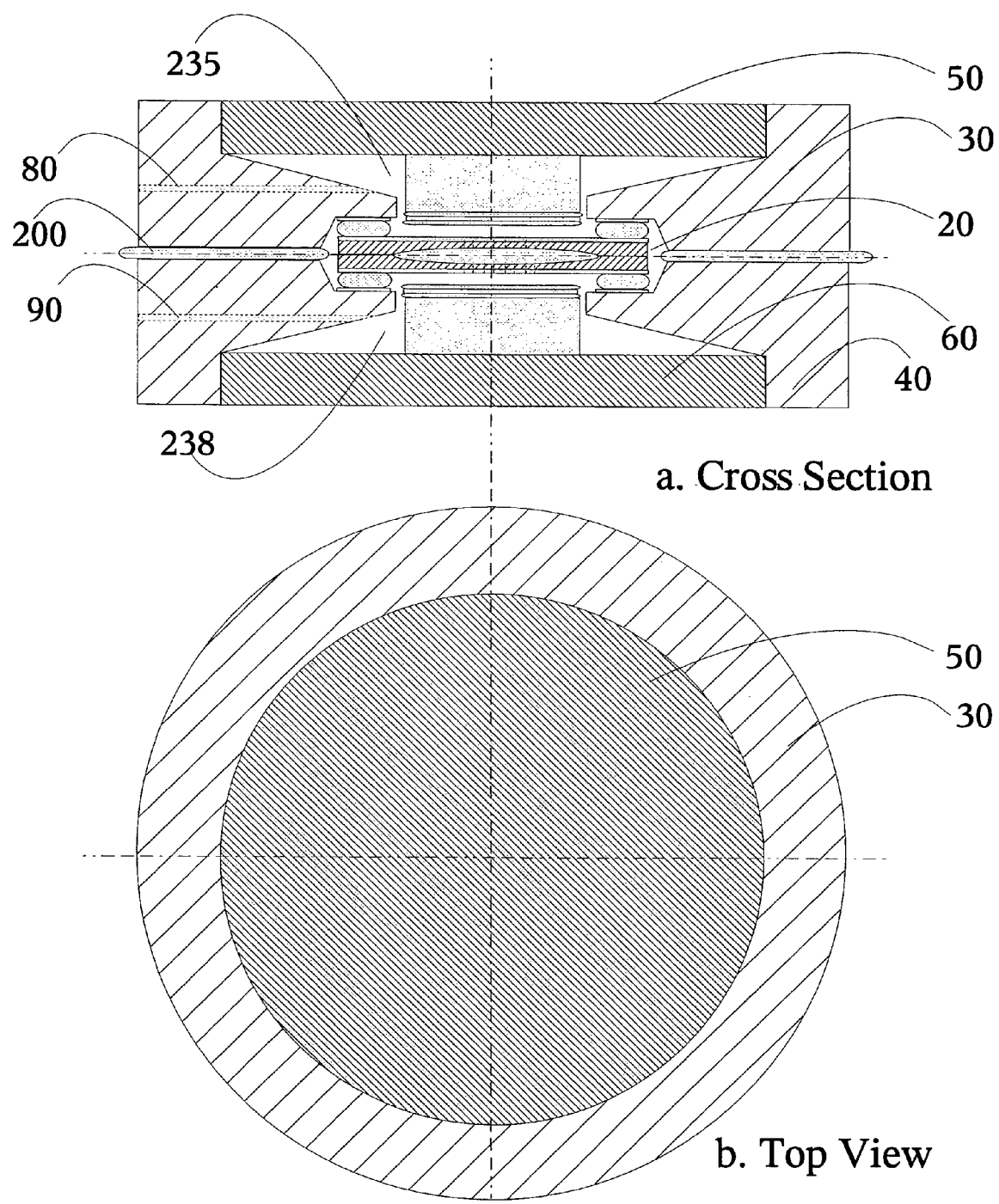
FIG. 2 shows the engine and generator in more detail, including a cross section and a top view.
Figure 3:
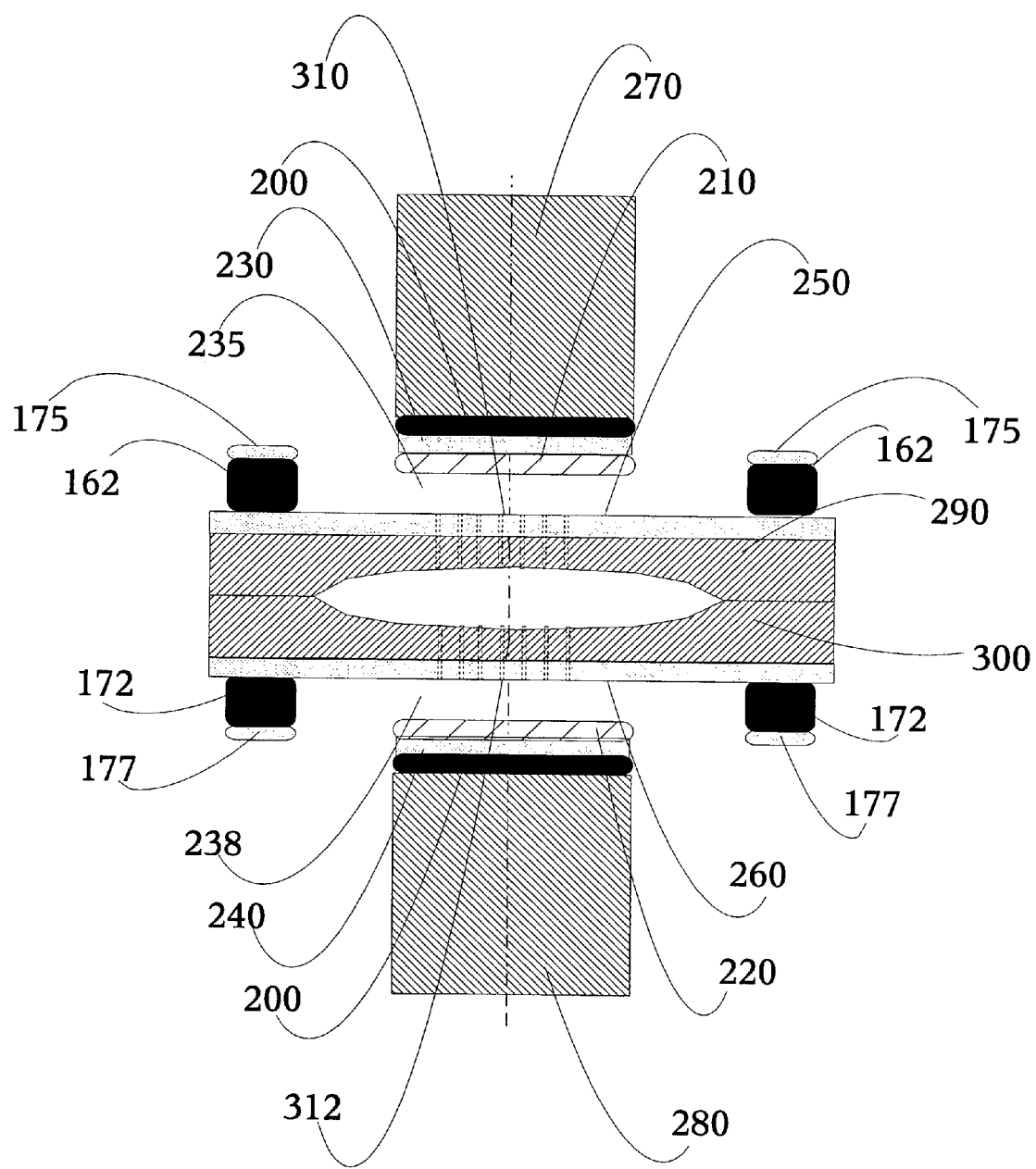
FIG. 3 shows a more detailed cross section of the combustion chamber and its associated components.

After the engine (10) has been started, as in FIG. 2, the HCCI in the deformable combustion chamber (20) drives the periodic expansion and contraction of the deformable combustion chamber, as in FIGS. 9a, 9b, and 9c, which, as in FIG. 3, via mechanical coupling (270,280) to the top (250, 290) and bottom (260,300) of the combustion chamber, as in FIG. 2, drives the top (50) and bottom (60) electro-mechanical transducers. As in FIG. 2, the combustion chamber (20) and electro-mechanical transducers (50, 60) provide a mechanical restoring force which repressurizes the combustion chamber (20) and thereby enables a self-sustaining ignition of incoming fuel/air charge on the next cycle. As in FIG. 1, power in excess of that necessary to drive self-sustaining combustion is extracted via the electro-mechanical transducers by the electronic control system (70) and constitutes the raw electric power output (130) of the device. The electronic control system (70) also controls the valve operation for the engine (10) to consume and combust the fuel/air mixture (80) and to expel exhaust gases (90).

In one embodiment, energy from the periodic combustion of the air/fuel mixture sustains the resonant oscillation of the combustion chamber and electro-mechanical transducers. This enables the engine to store energy over several cycles and enables operation as a 4-stroke engine in which HCCI occurs only every other cycle of the combustion chamber.

The integrated HCCI internal combustion engine and generator (10) is shown in FIG. 2. The engine (10) includes three parts, which, although integrated in the embodiment, are presented here separately for clarity. The engine (10) includes a deformable combustion chamber (20); a top housing (30) and a bottom housing (40) and bonding adhesive (200); and top (50) and bottom (60) electro-mechanical transducers and valves. Note that although the terms "top" and "bottom" are used to refer to points in the attached drawings, it is to be understood that these are explanatory labels only, and do not imply any particular physical orientation of the embodiment. Note also that although the drawings show the configuration of one embodiment, e.g., with symmetric top and bottom halves, the essential elements of the invention apply to other equivalent mechanical partitionings.

In the description below, the term "metallization" is taken to refer to a layer of electrically conductive material bonded to a substrate. The electrically conductive material may be metal, including, but not limited to aluminum; copper; gold; silver; or platinum.

In the description below, the term "adhesive" refers to a glue or fabrication technique in which two materials are permanently bonded together. These adhesive may include, but are not limited to thermoset adhesives; acrylic and acrylate adhesives; UV cured adhesives; polyurethane adhesives; epoxy adhesives; cyanoacrylate adhesives; and polysulphide adhesives. Adhesives with different temperature and electric dielectric properties are readily available.

In the description below the term "piezoelectric material" covers a well known family of materials that exhibit physical deformations as the result of an applied electric field, or vice versa. Such material may include, but is not limited to hard and soft piezo-ceramics; quartz; and piezoelectric polymers.

In the description below, variable capacitor-based sensing is introduced. These sensors are based on the fact that the electrical capacitance of two conducting plates is inversely proportional to the distance between the plates. Thus, by electrically measuring the capacitance of the sensor, one can directly infer the physical separation.

FIG. 3 shows an expanded drawing of the deformable combustion chamber (20) and its associated elements. The top (50) and bottom (60) electro-mechanical transducers are mechanically attached, by adhesive (205) or other means, to top and bottom insulating blocks (270, 280). These blocks, in turn, have a metallization layer (230, 240), forming, in conjunction with the metallization on the top and bottom of the combustion chamber (250, 260), variable capacitors that forms a combustion chamber separation sensor (180) (discussed below in more detail, see FIG. 8), and the top and bottom valve tampers (210, 220) respectively. By alternately covering and uncovering the orifices in the top (310) and bottom (312) of the combustion chamber, the valve tampers close and open the valves, respectively, as described below.

When there is a gap, shown in FIG. 3, between the top valve tamper (210) and the metallization (250) on the top (290) of the deformable combustion chamber (20), the valve is open, i.e., it admits the fuel/air mixture (80) into the deformable combustion chamber (20) through valve inlet holes (310) in the top of the combustion chamber (20). Conversely, when the top valve tamper (210) is pressed against the metallization (250) on the top (290) of the deformable combustion chamber (20), the valve is closed, isolating the air/fuel mixture (80) from the combustion chamber (20). The valve operation of the bottom valve tamper (220) and the metallization (260) on the bottom (300) of the deformable combustion chamber (20), and valve inlet holes (312), isolates the exhaust gases (90) from the combustion chamber (20) in an identical manner.

The combustion chamber (20) is bonded, via a high temperature top (162) and bottom (172) dielectric adhesive to a top (175) and a bottom (177) annular metallization attached, as in FIG. 2, to the top (30) and bottom (40) housing.

The top (160) and bottom (170) combustion chamber pressure sensors (see FIG. 8) are implemented as variable capacitors whose plates are the metallization on the top (175) and bottom (177) housing, and the metallization on the top (250) and bottom (260) of the combustion chamber, respectively. The space between the top (162) and bottom (172) plates is filled with a flexible, high temperature dielectric adhesive, that is compressed or expanded by net pressure of the combustion chamber on the housing. The top (160) and bottom (170) combustion chamber pressure sensors are used by the electronic control system to sense the net pressure exerted on the combustion chamber. A nonzero net pressure on the combustion chamber, indicated by unequal pressure between the two sensors indicates that the top (50) and bottom (60) electro-mechanical oscillators are oscillating out of phase, with the sign of the difference indicating whether the top disk (50) leads or lags the bottom disk (60) in phase. In response, by varying the instantaneous load on the raw electric power produced by the top (50) or bottom (60) disk, the electronic control system advances, or retards the phase of the appropriate electro-mechanical transducer oscillations until there is no net pressure on the combustion chamber. The electronic control system is discussed in more detail below.

In an embodiment, the top (160) and bottom (170) combustion chamber pressure sensors are implemented with annular piezoelectric material, bonded between the top (250) and bottom (260) of the combustion chamber metallization, and, as in FIG. 2, the top (30) and bottom (40) housing.

In an embodiment, the deformable combustion chamber assembly (250, 260, 290, and 300) is bonded with thermally conductive adhesive to heat sinks as a means of dissipating the excess heat generated in the combustion chamber.

Figure 4:
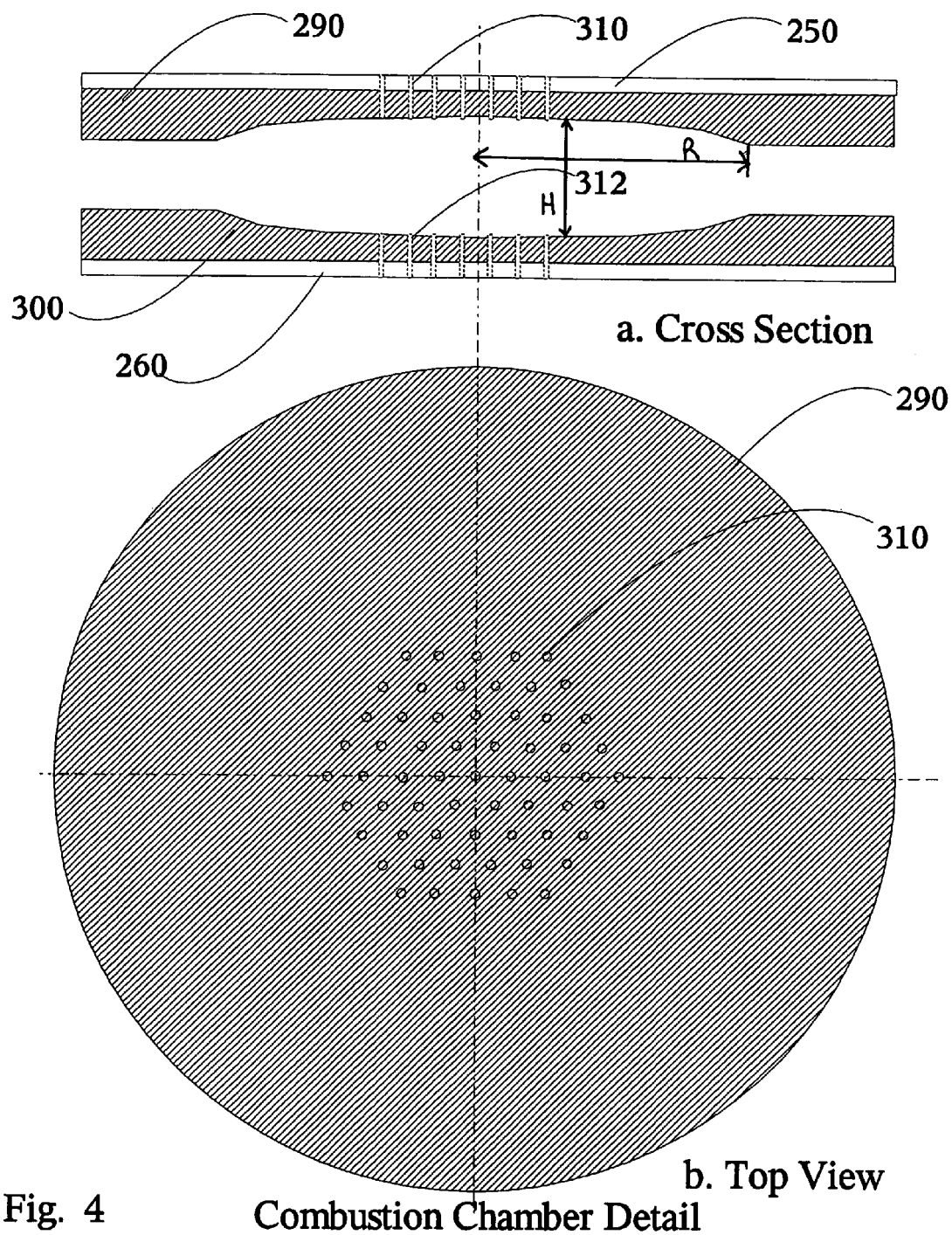
FIG. 4 shows the deformable, resonant combustion chamber (20)

An embodiment of the deformable combustion chamber is shown in FIG. 4. In its static configuration it is a bi-concave chamber, with a smoothly varying height (H) that is smaller with respect to its radius (R), and a mean thickness (T). When driven by pressure from combustion within the chamber, the chamber deforms axially (in the direction of its height) outward, increasing in volume. Alternatively, when driven by pressure from the top and bottom of the chamber, the chamber deforms axially inward, decreasing in volume. The difference between the maximum and minimum volume creates the compression necessary for HCCI. The specific dimensions are chosen based on the physical properties of the material, desired operating frequency, and desired power output. The material for the combustion chamber may include, but is not limited to: crystalline silicon; crystalline silicon carbide; and diamond. The table below summarizes an example design with a resonant frequency of 40 kHz. The table shows approximate values for the height (H), radius (R), and mean thickness (T) as a function of desired net power output, for chambers made of silicon, silicon carbide, and diamond.

|  | Power | | | |
| --- | --- | --- | --- | --- |
|  | 0.1 W | 1 W | 10 W | 100 W |
| Chamber H | 6.56 um | 14.1 um | 30.4 um | 65.6 um |
| Chamber R Thickness | 656 um | 1.41 mm | 3.04 mm | 6.56 mm |
| Silicon | 2.26 um | 10.5 um | 48.7 um | 226 um |
| Silicon Carbide | 1.52 um | 7.03 um | 32.6 um | 151 um |
| Diamond | 1.14 um | 5.27 um | 24.5 um | 114 um |

In one embodiment, the chamber is constructed of symmetric top (290) and bottom (300) halves that are fabricated separately and then assembled into a closed chamber. Fabrication techniques include, but are not limited to, Deep Reactive Ion Etching (DRIE). Assembly may be done manually or using robotic manipulators familiar to those skilled in the art of integrated circuit packaging. The top and bottom of the cylinder are also coated with a conductive metal layer (250, 260), that acts as part of a capacitor-based embedded sensor, and which is used to sense both the height (H) of the combustion chamber, as well as the distance between the top and bottom of the combustion chamber and the top and bottom insulating blocks (as described above).

Figure 5:
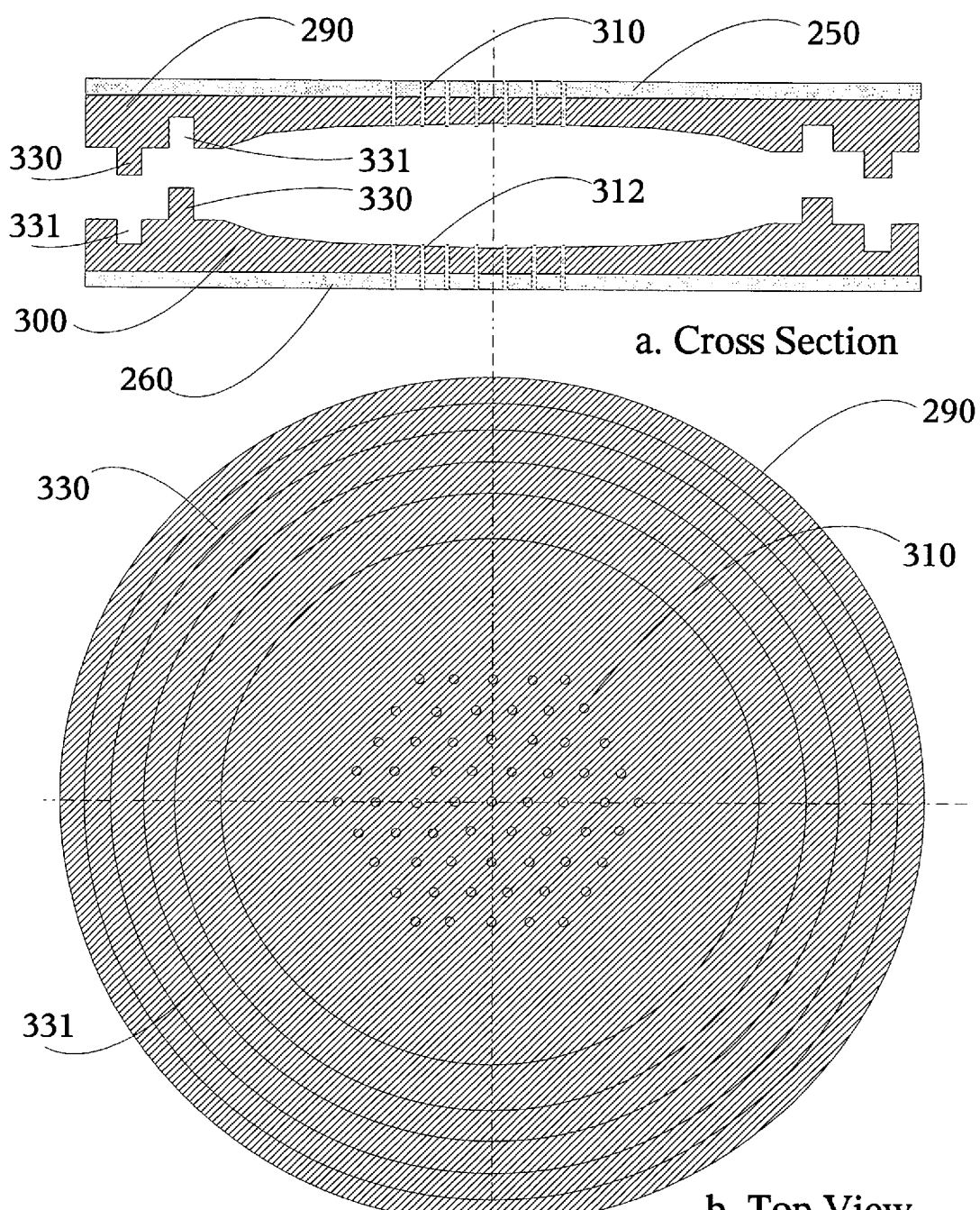
FIG. 5 shows an embodiment of the combustion chamber with interlocking ridges and troughs in the top and bottom halves.

In an embodiment shown in FIG. 5, the top (290) and bottom (300) halves of the combustion chamber are nearly symmetric, with a series of one or more concentric "ridges" (330) and "troughs" (331) that, when assembled, interlock with each other, providing positive registration of the halves relative to each other during manufacturing and an effective seal for the combustion chamber. Note that the position, dimensions, and shape, of the interlocking ridges (330) and troughs (331) are chosen such that they do not compromise the resiliency of the deformable combustion chamber.

The deformable combustion chamber has a top (310) and bottom (312) array of at least one, but possibly many, valve holes through the top (290) and bottom (300) of the combustion chamber, as well as through the top (250) and bottom (260) of the chamber metallization, respectively. The top valve hole(s) (310) provide(s) passage(s) through which the fuel/air mixture is admitted into the combustion chamber. Similarly, the bottom valve hole(s) (312) provide passages(s) for exhaust gases to be expelled. Note that although shown here for clarity as a hexagonal array of circular cylinders, other arrangements, and shapes of the holes in the array are possible.

In one embodiment, the materials and geometry of the combustion chamber are chosen such that the chamber has a primary axial mechanical resonance at the same frequency as the electro-mechanical transducers.

During compression, the combination of resonance of the cavity, and pressure from the resonating electro-mechanical transducers causes the deformable chamber to be flattened, thereby significantly reducing its internal volume as its mean height goes through a large reduction, while the radius stays approximately the same. Similarly, during the opposite phase of the oscillation, the combustion chamber distends, thereby increasing its volume relative to the resting state. The large relative difference in volume between the distended and flattened phases of the deformable combustion chamber allows the system to achieve very high compression ratio, on the order of 100:1, necessary to support high efficiency HCCI.

Figure 6:
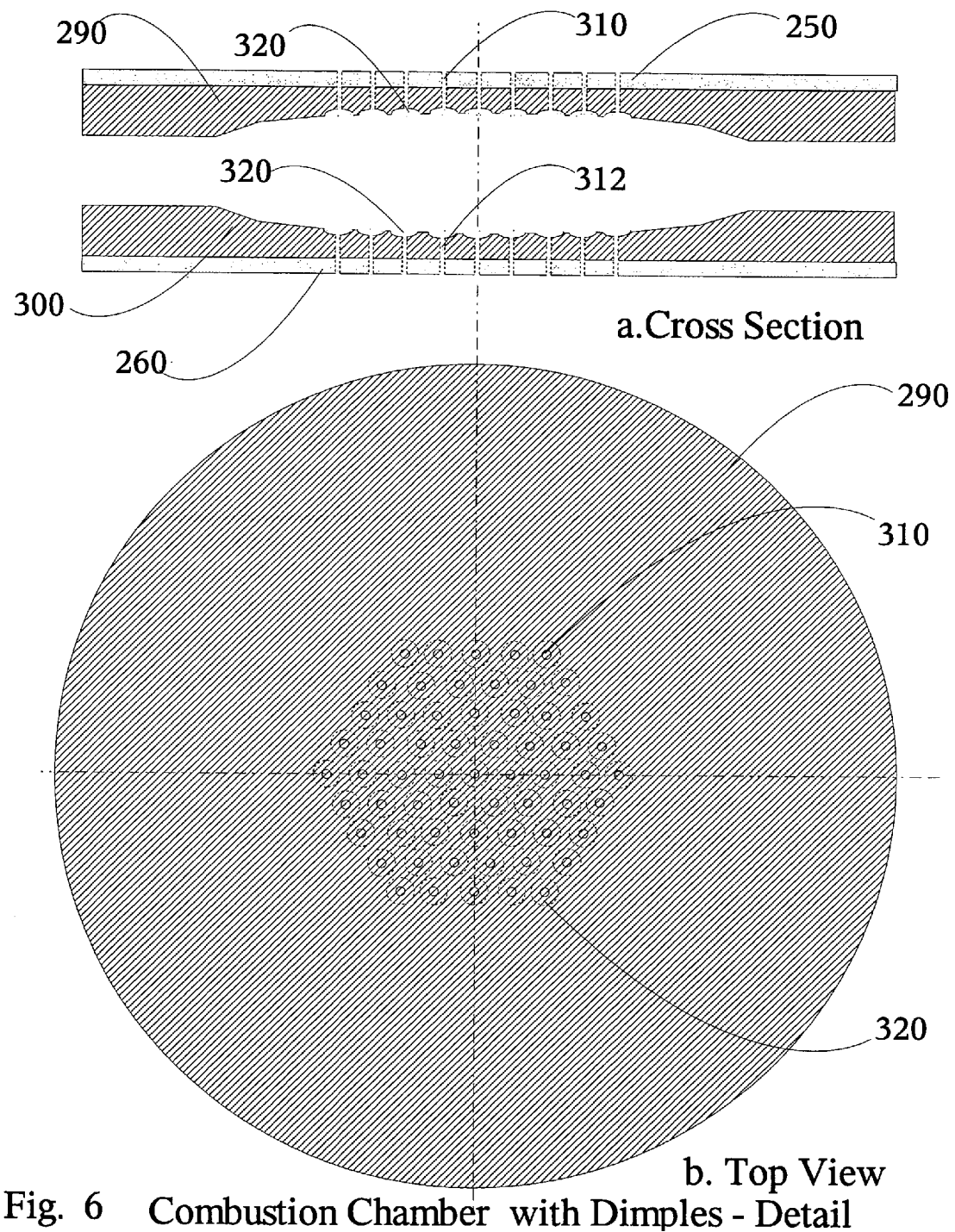
FIG. 6 shows an embodiment of the inside of the combustion chamber in which dimpled surfaces enhance local areas of HCCI.

In one embodiment, illustrated in FIG. 6, the valve holes (310, 312) terminate in an array of "dimples" (320) on the inside surfaces of the top (290) and bottom (300) halves of the combustion chamber. During the point of maximum compression of the deformable combustion chamber, these convex "dimples" surrounding the inlet and exhaust holes, form elliptical cross-sectioned sub-chambers that serve to focus pressure waves and create many small, toroidal regions of high pressure for the initiation of HCCI.

In one embodiment, the electro-mechanical transducers (40, 50) in FIG. 1, act as both generators and motors, i.e., the transducers (40, 50) are capable of producing a deflection as a result of an applied electrical power, as well as producing electrical power based on an applied mechanical force from the combustion chamber. Acting as motors, the transducers provide a mechanism for starting the reciprocating engine and for controlling valve actuation.

Acting as generators, the transducers convert the excess mechanical power of combustion into electric power. In one embodiment, the electro-mechanical transducers are implemented using disks of piezoelectric material. The top (50) and bottom (60) disks are constrained at the edges by the top (30) and bottom (40) housing, and flex axially, analogous to the surface of a drum, as the result of radial piezoelectric displacement, both when acting as motors and as the result of mechanical coupling with the deformable combustion chamber when acting as generators.

The following description provides some detail on this piezoelectric embodiment. Electro-mechanical transducers can also be implemented using different configurations of piezoelectric material, electromagnetic or electrostatic motor/generators. In addition, the function of motor and generator, and the function of valve control and compression of the combustion chamber during starting, could each be implemented with separate mechanisms.

Each of the top (50) and bottom (60) piezoelectric transducers is a disk of piezoelectric material matched during manufacturing in size, and mechanical and piezoelectric properties.

The top (50) and bottom (60) piezoelectric disks are attached at their edges to the top (30) and bottom (40) housing. The attachment mechanisms include, but are not limited to: bonding with adhesive; and mechanical clamping. In one embodiment, the space between the top housing (30) and top piezoelectric disk (50) acts as a conduit for the fuel/air mixture (80). Similarly, the space between the bottom housing (40) and the bottom piezoelectric disk (60) acts as a conduit for exhaust (90). The overall volume of the piezoelectric disks are chosen, based on the bulk volumetric power generation properties of the piezoelectric material, to match the electrical power generation capacity of the piezoelectric disks to the excess power produced by the HCCI combustion. The geometry of the piezoelectric stack is chosen such that the disks have a primary radial resonate frequency that matches the primary axial resonant frequency of the combustion chamber and which matches the desired system power output. It is desired that this frequency be above 20 kHz, such that it is outside the spectrum of human sound perception.

Figure 7:
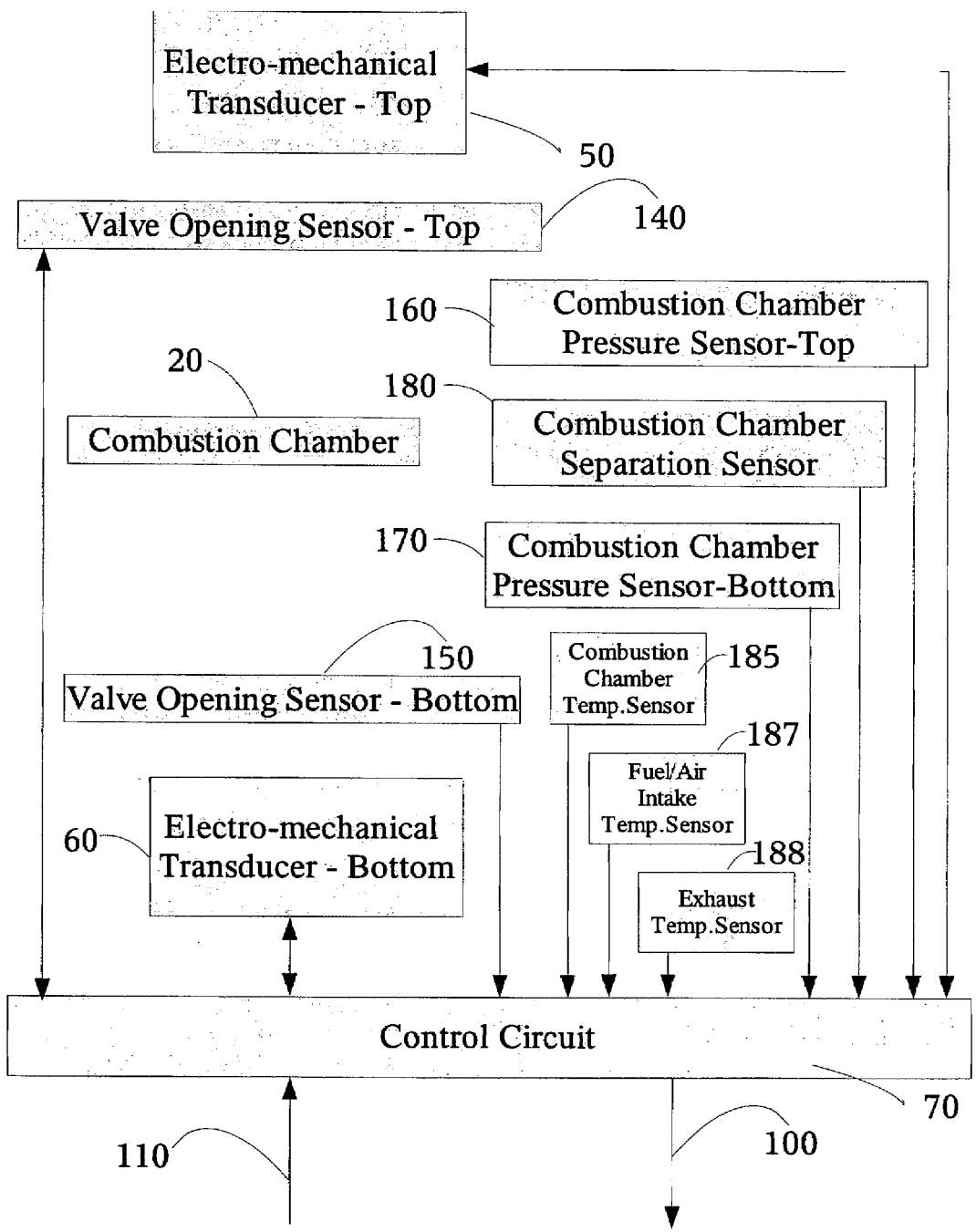
FIG. 7 shows a schematic diagram of the sensors and generators controlled by the electronic control circuit.

FIG. 7 shows the electronic control circuit (70) and the embedded sensors and transducers. The purpose of this ensemble is to start the self sustaining combustion process and to control the mechanical configuration of the piezoelectric disks and deformable combustion chamber, especially the fuel/air intake valves and the exhaust valves. Such active control enables a low cost manufacturing process in which the piezoelectric disks and housing need not be manufactured to the same tolerances as the deformable chamber. More importantly, the active dynamic control allows the system to compensate for movement and deformation of the system components as a result of heat transport and thermal expansion and contraction expected during normal operation of the system.

FIG. 8 shows one embodiment of the various embedded sensors. Note that although some of the capacitive sensors are shown to share the same metal surface as a contact, the various metallization described here can be electrically partitioned, for example, to prevent sharing of the same surfaces between sensors. These sensors may be implemented with technologies other than the ones described below. The temperature sensors may be placed in locations other than those shown in the attached figures in order to best measure local temperatures.

Combustion Chamber Pressure Sensor—Top (160): Implemented as a variable capacitor whose top plate is the metallization on the top housing (175) and whose bottom plate is the metallization on the top of the combustion chamber (250).

Combustion Chamber Pressure Sensor—Bottom (170): Implemented as a variable capacitor whose top plate is the metallization on the bottom of the combustion chamber (260) and whose bottom plate is the metallization on the bottom housing (177).

Combustion Chamber Separation Sensor (180): Implemented as a variable capacitor whose top plate is the metallization on the top of the combustion chamber (250) and whose bottom plate is the metallization on the bottom of the combustion chamber (260).

Valve Opening Sensor—Top (140): Implemented as a variable capacitor formed by the metallization on the top valve tamper (230) and the metallization on the top half of the deformable combustion chamber (250).

Valve Opening Sensor—Bottom (150): Implemented as a variable capacitor formed by the metallization on the bottom valve tamper (240) and the metallization on the bottom half of the deformable combustion chamber (260).

Combustion Chamber temperature sensor (185): Implemented as a thermocouple fabricated onto, or attached to, the deformable combustion chamber (20).

Fuel/Air Intake temperature sensor (187): Implemented as a thermocouple bonded to an inner surface of the upper housing (30).

Exhaust temperature sensor (188): Implemented as a thermocouple bonded to an inner surface of the bottom housing (40).

In addition, as shown in FIG. 7, the electronic control circuit (70) is provided with a source of external power (110), used to start the internal combustion engine. When the engine (10) is running, the electronic control circuit (70) produces regulated electric power (100) based on the raw power from the top (50) and bottom (60) piezoelectric disks.

Note that whereas the wires and integrated metallization required for connecting the electrical sensors and the piezoelectric disks to the electronic control circuit are not shown in the drawings of this description (to avoid clutter in the drawings), their existence is to be understood.

DESCRIPTION OF OPERATION

The system can operate in a two-stroke or a four-stroke mode, with appropriate valve timing. In either mode of operation, three phases of the engine cycle are controlled: (1) the compression of the deformable combustion chamber; (2) the opening of valves to admit the fuel/air mixture and to expel exhaust gases; and (3) the relative phase difference between oscillations of the top and bottom piezoelectric disks.

The deformable combustion chamber (20) compresses and decompresses in a resonant oscillatory manner, in which the resonance is driven:

During starting by the top (50) and bottom (60) piezoelectric transducers operating as motors.

During self sustaining operation of the engine by the homogenous charge compression ignition (HCCI) of the air/fuel mixture.

The deformation of the combustion chamber is illustrated in FIGS. 9a–9c. FIG. 9a shows the configuration of the deformable combustion chamber at the point of maximum distension. FIG. 9b shows the static configuration of the combustion chamber. FIG. 9c shows the combustion chamber at the point of maximum compression (and minimum volume).

As in FIG. 2, the top (50) and bottom (60) piezoelectric transducers also oscillate in a resonant manner. Their resonance is driven:

During starting by an alternating electrical voltage applied to the top (50) and bottom (60) piezoelectric transducers operating as motors.

During self sustaining operation of the engine by contact with the top and bottom of the compression chamber during the power stroke following charge ignition.

As in FIG. 3, valves for admitting the fuel air mixture and for allowing exhaust gases to escape, while insuring very high compression of the air/fuel mixture for ignition, are formed by the controlled contact and separation of the top (210) and bottom (220) valve tampers (attached rigidly to the top and bottom piezoelectric disks, respectively), and the top (250) and bottom (260) of the combustion chamber, respectively.

As in FIG. 7, the electronic control circuit (70) controls the opening of these valves during starting by varying the electrical signal driving the top (50) and bottom (60) piezoelectric transducers so that the amplitude of the axial deflection of the piezoelectric disks is slightly larger than the maximum amplitude of the combustion chamber. The values of top (140) and bottom (150) valve opening sensors are used as feedback by the electronic control circuit (70) to determine whether the valves are opened, or not; and if the valves are opened, how far they are opened.

As in FIG. 7, the electronic control circuit (70) controls the opening of these valves during self-sustaining engine operation by placing a time varying load on the top (50) and bottom (60) piezoelectric transducers. This load serves as both the power output of the generator, and as a median for controlling the amplitude, average values and relative phase of the oscillations of the piezoelectric transducers.

The control regimes are specified relative to oscillatory displacement of the top (400) and bottom (410) of the combustion chamber as shown in FIG. 10. For purposes of discussion, this phase is measured and described in radians, with maximum compression of the chamber occurring every $(2k+1)\pi$ radians; the maximum distension occurring every $(2k\pi)$ radians; the maximum rate of change of the combustion chamber volume occurring at $2k\pi+\pi/2$ and $2k\pi+3\pi/2$; where k is an integer.

Compression Control (500): In the phase vicinity of $(2k+1)\pi$ radians, the control algorithm uses the combustion chamber separation sensor (180) to control the top (50) and bottom (60) piezoelectric disks (as in FIG. 7) to insure sufficient compression of the homogenous charge for ignition.

Phase Control (490): In the vicinity of $2k\pi+\pi/2$ and $2k\pi+3\pi/2$, the control algorithm uses the top (160) and bottom (170) combustion chamber pressure sensors to control the phase between the top (50) and bottom (660) piezoelectric disks (as in FIG. 7).

Valve Control (480): In the vicinity of $(2k\pi)$, the control algorithm uses the top (140) and bottom (150) valve opening sensors (as in FIG. 7) to control the opening of the fuel/air intake and exhaust valves, respectively.

FIG. 11(a) shows a flow chart for the proposed electronic control system. The flow matches the load control regimes described earlier, and comprises a continuous control loop. This program applies to both piezoelectric transducers.

The program flow operates in four phases of operation, corresponding to the cycle of load control regimes described above: valve control; phase control; compression control; and phase control (repeated). In general, within each of these phases there is a sampling operation in which values from the appropriate embedded sensors are sampled; a control computation; and a control assertion.

During the control computation operations a control signal is computed based on the current sampled state, the desired target control values, and information from environmental sensors such as the fuel/air, combustion chamber, and exhaust temperatures. Note that the control functions for each of the phases is general, and may include filtering of the input samples to remove measurement noise, and proportional, rate, and integral feedback with the appropriate gains to insure the stability of the controlled system.

During the control assertion operation, the control value computed earlier is applied to the system, by placing greater or less instantaneous electrical load on the electro-mechanical transducers (50, 60) as in FIG. 2.

The desired target control value for the phase difference between the top and bottom oscillations is zero.

The desired target control value for the compression of the deformable combustion chamber is just enough to insure reliable combustion of the homogenous fuel/air charge and is a function of the fuel/air ratio and environmental temperatures.

FIG. 11b shows the target control values for the fuel/air and exhaust valves for 2-stroke operation of the engine.

FIG. 11c shows the target control values for the fuel/air and exhaust valves for 4-stroke operation of the engine. Note that the 4-stroke operation takes place over 2, 4-phase cycles.

2-Stroke and 4-stroke engine operation are described further below.

2-Stroke Operation

The operation as a 2-stroke engine is described with respect to FIG. 12, where FIG. 12a represents a schematic view of the combustion chamber and valve operation; and FIG. 12b represents a waveform of the displacement of the top (400) and bottom (410) halves of the combustion chamber. Time is increasing toward the right in FIGS. 12a and 12b. Note that the "phases" referred to below are not the same as the load control regime phases presented earlier.

Fuel/Air Intake and Exhaust Phase (360): The sequence is shown starting with the fuel/air intake and exhaust phase (360). During this phase, both top (340) (intake) and bottom (350) (exhaust) valves are open. New fuel/air mixture (420) is forced into the distended combustion chamber and the chamber forces the exhaust gases (430) from the previous cycle out of the chamber.

Compression Phase (370): During the compression phase (370), both the top (intake) and bottom (exhaust) valves close and the air/fuel mixture is compressed as the combustion chamber's volume decreases.

Ignition (380): When the temperature and pressure of the air/fuel mixture reaches a critical threshold, compression ignition takes place.

Power Stroke (390): During the power stroke (390), the combustion drives the combustion chamber open, imparting power to deflect the piezoelectric disks, for the next cycle, and providing excess power for electrical output.

4-Stroke Operation

FIG. 13 illustrates the operation as a 4-stroke engine. FIG. 13a is a schematic view of the combustion chamber and valve operation. FIG. 13b is a waveform of the displacement of the top (400) and bottom (410) halves of the combustion chamber. Time is increasing toward the right of the drawing in both FIGS. 13a and 13b.

Intake Stroke (440): During the intake stroke (440), the top (intake) valve is open (340), while the bottom (exhaust) valve is closed. The fuel/air mixture (420) is drawn into the opening combustion chamber by negative pressure from the previous cycle.

Compression Stroke (450): During the compression stroke (450), the top (intake) valve is closed, causing the fuel/air mixture to be compressed, and, ultimately to ignite (455).

Power Stroke (460): During the power stroke (460), energy from the charge ignition drives the combustion chamber open, imparting power to drive the resonance of the engine, for the next cycle, and providing excess power for electrical output.

Exhaust Stroke (470): During the exhaust stroke (470), the bottom (exhaust) valve (350) is opened, and the exhaust gases are pumped out as the combustion chamber again compresses, leaving the combustion chamber empty for the beginning of the next intake stroke.

The mechanical resonance of the combustion chamber and piezoelectric transducers is used for operation as a 4-stroke engine. In this case, energy from the power stroke, in which combustion energy is imparted to the system, is stored to cause the oscillations for the subsequent exhaust, intake, and compression strokes, in which the engine itself produces no driving power from ignition.

Although multiple embodiments of the invention have been described, many variations and modifications will become apparent upon reading the present application.

What is claimed is:

1. A reciprocating internal combustion engine comprising:
   a deformable combustion chamber for creating compression ignition of a homogenous air/fuel mixture;
   a set of orifices in the combustion chamber for allowing the passage of fuel/air mixture into the deformable combustion chamber and exhaust out of the deformable combustion chamber;
   two or more compliant valve tampers mechanically coupled to two or more independently controlled linear transducers for providing controllable intake and exhaust valves at said orifices; and
   an electronic control mechanism responsive to embedded sensors in the engine for initiating a self-sustaining series of ignitions; controlling opening and closing of intake and exhaust valves; and compensating for variations in the mechanical configuration of the engine introduced during manufacturing and as a result of dynamic operation of the engine.

2. The engine of claim 1, wherein the engine is mechanically coupled to an electric generator for converting power from the chemical combustion of fuel to electrical power.

3. The engine of claim 1, wherein the chamber has a rotationally symmetric bi-concave shape.

4. The engine of claim 1, wherein the chamber has an upper half and a lower half, the upper and lower halves assembled to make a closed chamber.

5. The engine of claim 1, wherein the material, geometry, and dimensions of the chamber are chosen to provide a primary resonant frequency in an axial direction which matches the operational frequency of the reciprocating engine.

6. The engine of claim 1, further comprising top and bottom electro-mechanical transducers, wherein the control system includes a circuit for starting 2-stroke operation of the engine by applying a series of signals to the top and bottom electro-mechanical transducers which excite these transducers, and through them the combustion chamber, into mechanical resonance; such that when the amplitude of the resonant oscillations is sufficiently large, the top and bottom valves open, admitting a fuel air/mixture into the combustion chamber; and then the top and bottom valves close, sealing the combustion chamber; the chamber is compressed, causing compression ignition which then drives the combustion chamber open, and thence the self-sustaining operation of the engine from combustion energy.

7. The engine of claim 1, further comprising top and bottom electro-mechanical transducers, wherein the electronic control system includes a circuit for starting 4-stroke operation of the engine by applying a series of signals to the top and bottom electro-mechanical transducers which excite these transducers, and through them the combustion chamber, into mechanical resonance; such that, when the amplitude of the resonant oscillations is sufficiently large, the top valves open, admitting a fuel air/mixture into the combustion chamber, with the bottom valve closed; the top and bottom valves close, sealing the combustion chamber; the chamber is compressed, causing compression ignition which then drives the combustion chamber open, and thence the self-sustaining operation of the engine from combustion energy.

8. The engine of claim 1, further comprising top and bottom electro-mechanical transducers, wherein the electronic control system includes a circuit for controlling self-sustained operation by applying a time varying load to the top and bottom electro-mechanical transducers which controls the top and bottom valve opening sequence; the pressure on the combustion chamber; and the phase synchronization of the top and bottom oscillations.

9. The engine of claim 8, wherein the frequency of operation is controlled to match the mechanical resonant frequency of the electro-mechanical transducers and combustion chamber.

10. The engine of claim 2, further comprising a single pair of electro-mechanical transducers for starting the engine while acting as electric actuators; controlling the opening of the top and bottom valves while acting as electric actuators; and extracting electrical power from the engine while acting as electric generators.

* * * * *